3,243,455
POLYETHER HYDROXYSULFONATE SURFACE
ACTIVE AGENTS
Louis C. Pizzini, Trenton, and John T. Patton, Jr., Wyandotte, Mich., assignors to Wyandotte Chemicals Corporation, Wyandotte, Mich., a corporation of Michigan
No Drawing. Filed June 29, 1962, Ser. No. 206,204
7 Claims. (Cl. 260—513)

This invention relates to a new class of surface active agents. In a more specific aspect, this invention relates to a class of polyether hydroxysulfonate surface active agents, the members of which have been found to have strikingly unique properties.

Polyether compounds which are condensates of alkylene oxides, such as condensates of ethylene oxide, propylene oxide and butylene oxide, have been developed industrially during the past few years for many diverse uses. These include uses as polyol reactants for producing polyether polyurethanes, functional fluids, such as cutting oils and hydraulic fluids, and surface active agents, especially nonionic surface active agents. Such polyether compounds as have been offered commercially so far have possessed certain limitations, however, and there is a need for compounds of this type having new, improved and unique chemical and physical properties. Lack of compatibility with other active ingredients in detergent compositions and relatively weak emulsifying power have been limitations on previously known polyether surface active agents. In another important commercial area, the demulsification of crude oil-water emulsions, many alkylene oxide condensate polyethers have been proposed in the literature for use, but a water-based demulsifier composition having a broad range of applicability is still needed.

An object of this invention is, therefore, to provide a new class of polyether alkylene oxide condensates which has unique surface active properties.

A further object is to provide a class of anionic surface active agents based on polyether alkylene oxide condensates.

A more specific series of objects is to provide a new class of surface active agents that has improved emulsification properties for difficultly emulsifiable polyether functional fluids, improved demulsification properties for crude oil-water emulsions and improved washing and cleaning properties for use in detergent compositions.

We have discovered that a class of anionic surface active agents, which is based on polyether alkylene oxide condensates and which has the general formula shown below, has several remarkably unique properties. The general formula for the composition of this invention is

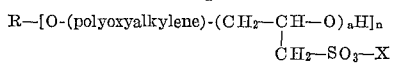

R—[O—]$_n$ represents a lower molecular weight alcohol having $n$ number, 1 to 6, of hydroxyl groups with its hydroxyl hydrogen atom or atoms removed and in which R is a saturated hydrocarbyl radical having 1 to 6 carbon atoms. Polyoxyalkylene represents a chain of lower oxyalkylene groups having the general formula $(C_mH_{2m}O)_x$ or $(C_mH_{2m}O_2)_x$ in the case of methyl glycide and its homologues and having a molecular weight which, together with the molecular weight of the alcohol and when multiplied by the number $n$ is in the range of about 1000 to 75,000, $a$ is a number in the range from 1 to about 4, and X is a cation, such as sodium, potassium, ammonium, calcium, magnesium or lower alkyloyl-substituted ammonium. An example of a compound of the invention is one which is prepared by condensing propylene oxide with propylene glycol to obtain a polyoxypropylene diol chain having a molecular weight of about 2000, reacting at least a stoichiometric amount of an epihalohydrin with the polyoxypropylene diol and then sulfonating the resulting haloglyceryl ether by reaction with sodium or potassium sulfite. This compound and the others encompassed by the general formula for the composition of the invention have certain unique and advantageous properties.

One such property is the capability of forming stable emulsions of water and polyether alkylene oxide condensates. The composition of the invention emulsifies water and such compounds as trimethylolpropane-propylene oxides condensates and the resulting emulsions are homogeneous and stable.

Another unique property of the composition of the invention is that of effectively demulsifying crude oil-water emulsions.

A still further unique property of the composition of the invention is its effectiveness in a detergent formulation for washing fabrics. The composition of the invention is not only an active detergent in facilitating soil removal but has the remarkable property in itself of preventing the redeposition of soil on the fabric. Conventional detergent formulations in which the active agent is an alkylarylsulfonate, for example, require sodium carboxymethylcellulose to prevent soil redeposition.

Such detergent compositions containing a polyether hydroxysulfonate surface active agent of the invention instead of an alkylarylsulfonate and not containing any sodium carboxymethylcellulose are as effective or more effective in preventing soil redeposition as a detergent composition containing both an alkylarylsulfonate active agent and sodium carboxymethylcellulose.

Each of the particular steps that are followed in producing the composition of the invention can be carried out by procedures and under conditions that are previously known. Initially, the lower molecular weight alcohol is condensed with a lower molecular weight alkylene oxide. The procedures, catalysts and conditions that are desirable for reacting an alkylene oxide, such as propylene oxide, with an alcohol, such as propylene glycol or trimethylolpropane, are known. Elevated temperatures and alkaline catalysts, such as sodium hydroxide or potassium hydroxide, are usually employed. Exemplary disclosures of the process and process conditions involved in this step are found in U.S. 2,677,700, U.S. 2,674,619, U.S. 3,036,118 and U.S. 3,036,130.

The second step involves the reaction of an epihalohydrin, such as epichlorohydrin, with the polyether alcohol-alkylene oxide condensate. The condensate has a polyoxyalkylene chain terminating with a hydroxyl group attached to the alcohol at the site of each of the hydroxyl hydrogen atoms in the starting alcohol and a sufficient proportion of the epihalohydrin is used to insure that there is at least one mol of the epihalohydrin reacted with each of such terminal hydroxyl groups. It is sometimes desirable to use an excess of the epihalohydrin, especially where the polyether alcohol-alkylene oxide condensate is of high molecular weight and consequently possesses strong hydrophobic properties. Usually, up to about 4 mols of the epihalohydrin per hydroxyl can be used.

Condensing catalysts are usually used in reacting the epihalohydrin with the alcohol. Typical catalysts are those of the Friedel-Crafts type, including anhydrous aluminum chloride, boron trifluoride, zinc chloride, ferric chloride, stannic chloride, and complexes such as the well-known boron trifluoride etherates. Acid type catalysts can also be used including hydrofluoric acid, sulfuric acid and phosphoric acid. The concentration of the catalyst employed for the reaction of the epihalohydrin with the alcohol-alkylene oxide condensate can be varied, depending upon the individual catalyst. For example, from about 0.1 weight percent to about 0.2 weight percent of boron trifluoride or a complex thereof, based on the total weight of reactants, provides satisfactory results. In general, the condensing catalyst for the epihalohydrin reaction is used in small concentration, up to about 5 weight percent, and generally is less than one weight percent of the weight of the total reactants.

The temperature observed during the epihalohydrin reaction usually falls between about 25° C. and 175° C. In order to avoid color formation, we generally control the temperature within the range of about 50° C. to about 65° C. when using boron trifluoride-diethyl etherate or stannic chloride catalysts. Furthermore, it is customary when carrying out the epihalohydrin reaction to employ substantially dry reactants because water neutralizes or destroys the acid catalysts, especially a boron trifluoride complex catalyst.

The haloglyceryl ether intermediate product resulting from the reaction of the epihalohydrin with the alcohol-alkylene oxide condensate has the general formula shown below:

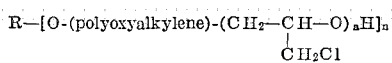

However, it is true that the epoxide ring of the epihalohydrin can also open to produce a haloglyceryl ether having the structure,

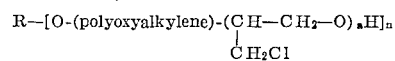

and in such a case the polyether hydroxysulfonate compound of the invention that is made from such a haloglyceryl ether has the structure,

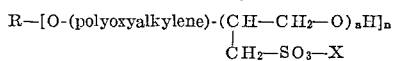

It is likely that a mixture of these isomeric compounds of the invention are produced and that only a minor percentage of the last described type is present in the product. The principal structure for the compound of the invention is that which was given first hereinabove and this structure in the specification and claims appended hereto stands for both types of isomers and mixtures of these isomers.

The final step in the preparation of the composition of the invention consists in sulfonating the halogen hydrin intermediate product. This step can be carried out in either of two ways, both of which involve previously known reaction conditions. The halogen hydrin intermediate product can be reacted directly with an alkali metal sulfite or the halogen hydrin first can be dehydrohalogenated by splitting off hydrochloric acid in a known way to yield an epoxide which is then reacted with an alkali metal sulfite, preferably a bisulfite. The reaction with the sulfite is carried out in aqueous solution or suspension at ordinary or elevated pressure and at elevated temperature. Neutral sulfites preferably are employed when starting with the halogen hydrin and acid sulfites, such as sodium bisulfite or potassium bisulfite, are better suited for reaction with the epoxide. Normally, we employ sufficient water as the reaction medium so that a final product having an active agent concentration of about 50 weight percent is produced. The halogen hydrin or epoxide that is reacted with the sulfite is generally water insoluble and its is desirable, but not necessary, to include in the sulfite reaction system a mutual solvent or hydrotroping agent to facilitate the reaction and in order to insure that the final product exists as a homogeneous aqueous system over the broad ranges of temperature and concentration at which the product of the invention is used and produced. Although, the addition of the hydrotroping agent can be postponed until after the sulfonation reaction is completed, addition of the hydrotroping agent, such as sodium toluenesulfonate, at the start of the sulfonation reaction is desirable because it aids in carrying out the reaction and in reducing the reaction time that is required.

An additional optional ingredient that can be used in the sulfonation reaction is a small percentage, such as 1-10 weight percent, of a previously prepared polyether hydroxysulfonate composition of the invention. The polyether hydroxysulfonate acts as an emulsifying agent for the halogen hydrin intermediate and the aqueous sulfite reactant, thereby reducing the reaction time that is required. This has the further advantage of helping to prevent unwanted side reactions.

A further advantage for adding a hydrotroping agent to either the final polyether sulfonate product or to the halogen hydrin-sulfite reaction system is that the storage stability, that is, the maintenance of a homogeneous aqueous solution, of the final product is enhanced.

The alcohols that can be used in the first step of the process for producing the composition of the invention are alcohols having up to about 6, inclusive, carbon atoms and having from about 1 to 6, inclusive, hydroxyl groups. These alcohols include monohydroxy aliphatic alcohols, such as methanol, propanol, butanol, hexanol, as well as phenol, cyclohexanol and the like, glycols, such as ethylene glycol, propylene glycol, butylene glycol, and the like, polyoxyalkylene glycols, such as diethylene glycol, dipropylene glycol and triethylene glycol, alkyl ethers of glycols, such as methyl ether of ethylene glycol, ethyl ether of propylene glycol, butyl ether of ethylene glycol, aliphatic polyols, such as trimethylolethane, trimethylolpropane, pentaerythritol, glycerol, 1,5-pentanediol, 1,2,6-hexanetriol and mono- or dialkyl ethers of aliphatic triols and mono-, di- or trialkyl ethers of tetrols. Mixtures of such alcohols can also be used. The starting alcohol does not have a large influence on the properties of the final polyether hydroxysulfonate composition of the invention and any alcohol falling within the definitions given above can be used.

The alkylene oxides that are used in the first step of the process for producing the composition of the invention are the lower alkylene oxides, those having from 2 to 4, inclusive, carbon atoms. These include ethylene oxide, propylene oxide, butylene oxide, including its various isomers, and methyl glycide. The alcohol-alkylene oxide condensate that is produced in the first step of the process for producing the composition of the invention provides the hydrophobic portion of the anionic surface active composition of the invention. Therefore, there is an upper limit on the proportion of ethylene oxide that can be used in the reaction between the alcohol and the alkylene oxide. Generally, ethylene oxide can be used only in admixture with one of the other alkylene oxides that has been disclosed. When ethylene oxide is used together with propylene oxide, the amount of ethylene oxide used should not exceed about 50 weight percent of the weight of propylene oxide that is used. When ethylene oxide is used in conjunction with butylene oxide or methyl glycide, the proportion of ethylene oxide can be as high as about 70 weight percent. Of course, all kinds of mixtures of these alkylene oxides can be used. Such mixtures as mixtures of ethylene oxide, propylene oxide and butylene oxide can be used. When the term "mixtures" is employed, the term is intended to include mixtures produced by the sequential reaction of first one alkylene oxide and then another or first one mixture of alkylene oxides and then another which tends to produce blocks or chains of oxyalkylene groups corresponding to the alkylene oxide that is used in each step or sequence. The result of condensing an alkylene oxide or alkylene oxide mixture with an alcohol is known to produce a mixture of products of varying molecular weight. Such mixtures are referred to as cogeneric mixtures and the molecular weight is the theoretical average molecular weight of such a mixture.

The alcohol-alkylene oxide condensate that results from the reaction with the alcohol should have a molecular weight in the range of about 1000 to 75,000. The molecular weight range must take into consideration the number of hydroxyl groups in the starting alcohol, however, and where there are two such hydroxyl groups, for example, the molecular weight range includes the molecular weight of both oxyalkylene chains that are formed.

Wherever molecular weights are indicated in the specification or in the claims that are appended hereto, and unless otherwise specifically noted, the theoretical molecular weight is meant which is based on the weight in grams of the alkylene oxide or alkylene oxide mixture that is used combined with the gram-molecular weight of the starting alcohol.

Products made using propylene oxide are specially preferred and such a product made from propylene glycol and propylene oxide in which the molecular weight of the glycolpropylene oxide condensate is in the range of about 1500–2500 is the preferred species of the composition of the invention.

The epihalohydrins that are used in the second step of the process for producing the composition of the invention include epichlorohydrin, epibromohydrin and epiiodohydrin. The latter epihalohydrins are characterized by a three-carbon chain. Epifluorohydrin and its analogues are not included within the term "epihalohydrin" in this specification. In view of its ready availability and low cost, epichlorohydrin is the preferred epihalohydrin for use.

The alkali metal sulfites and bisulfites that are used include sodium or potassium sulfites. The use of these sulfites results in an anionic polyether hydroxysulfonate composition of the invention in which the cation is either a sodium or a potassium atom. If it is desired to have anionic polyether hydroxysulfonate salts other than the sodium or potassium salts, such as the calcium, magnesium, ammonium or alkylol-substituted ammonium salts, a sodium or potassium salt can be passed over an ion exchange resin to replace the sodium ion with a hydrogen ion and the resulting free acid then can be neutralized with calcium or magnesium hydroxide, ammonia or alkylol-substituted ammonia, e.g., the mono-, di- or triethanol or propanol amines.

The sulfonation reaction is usually carried out at temperatures in the range from about 100° C. to 250° C. and the reaction is usually carried out under a superatmospheric pressure in order to facilitate the achievement of the desired reaction temperature. Pressures up to about 600 p.s.i.g. can be employed. We prefer to use a temperature in the range of 150° C. to 200° C.

Normally, an excess of the sulfite or bisulfite is employed in the reaction with the halogen hydrin or its epoxide.

The following examples are provided in order to illustrate the composition of the invention. These examples should not be employed to restrict unduly the scope of this invention.

EXAMPLES

A series of compositions according to the invention was prepared using different alcohol starting compounds, different alkylene oxides and mixtures of alkylene oxides and varying proportions of epichlorohydrin. However, the procedure that was followed was generally the same for all of the compositions. All of the compositions corresponding to the formula for the composition of the invention which is

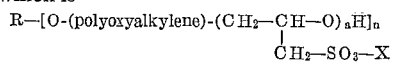

and the examples that were prepared are summarized below in Table I in which only the variable items in the formula above are defined for each composition of the invention that was prepared. All of the compositions were prepared using sodium sulfite excepting only Example No. 3 which was prepared using potassium sulfite. Therefore, in the formula for the compositions that were prepared X is sodium in every case except Example 3 where it is potassium.

The first step in producing the compositions consisted in carrying out the condensation of the alcohol, represented by R—[O—]$_n$, with an alkylene oxide or mixture of alkylene oxides to produce a polyether polyol intermediate which can be represented by the formula:

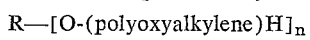

This step was carried out at elevated temperature and pressure in the presence of an alkaline catalyst in a manner that is well known in the art of alkylene oxide condensation reactions. The particular alcohols and particular alkylene oxide combinations that were used are given in Table I. The polyoxyalkylene molecular weight that is given in Table I is the theoretical molecular weight based on the weight of the alkylene oxide that was used and it includes the moleculor weight of the starting alcohol.

The second step consisted in reacting the polyether polyol with epichlorohydrin to produce a chlorohydrin ether or chloroglyceryl ether intermediate product having the formula:

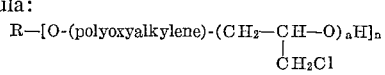

The molar ratio of epichlorohydrin per hydroxyl group in the polyether polyol that was used is represented by $a$ and is reported in Table I. Boron trifluoride-etherate complex catalyst was used in preparing those compositions where alkylene oxides other than ethylene oxide were employed to produce the polyether polyol. Stannic chloride catalyst was used as the catalyst for reactions between epichlorohydrin and polyether polyols that contained oxyethylene groups.

The specific procedure employed a closed reactor from which air was removed and involved first adding the catalyst to the polyether polyol, stirring and heating the resulting mixture to about 50° C. and then slowly adding epichlorohydrin while cooling the reaction system to control the resulting exothermic reaction.

The final step consisted in sulfonating the chlorohydrin intermediate by reaction with an aqueous suspension of an alkali metal sulfite. The chlorohydrin intermediate was reacted directly with the sulfite without first dehydrohalogenating the halohydrin intermediate to produce an epoxide. The acid catalyst in the polyether polyol was neutralized by addition of sodium carbonate prior to carrying out the reaction with the sulfite. The proportion of sulfite that was used amounted to a slight excess over the stoichiometric amount required to sulfonate each mol of epichlorohydrin that had been introduced into the polyether polyol. Thus, from about 1.0 to 1.8 mols of the alkali metal sulfite per mol of epichlorohydrin in the halohydrin intermediate were used. Again, a closed reactor was employed from which air was removed. The aqueous reaction system was stirred and heated to about 165° C. during the reaction. The amount of water that was used was that amount which provided a final product in which the active agent concentration ranged from about 35 to 60 weight percent.

These formulations are given on an anhydrous basis and were used in 0.25 weight percent aqueous solutions.

The detergency tests that were used are the carbon soil removal test and whiteness retention test that are fully described in U.S. 2,677,700, columns 14–16, and the results of the whiteness retention tests show the power of the active agent in the formulation to prevent soil redeposition. The standard alkylarylsulfonate that was used in

*Table I*

| Ex. No. | R | $n$ | Polyoxyalkylene | Polyoxyalkylene molecular weight | $a$ |
|---|---|---|---|---|---|
| 1 | Propylene glycol | 2 | Polyoxypropylene | 1,425 | 1.2 |
| 2 | do | 2 | do | 2,500 | 1.2 |
| 3 | do | 2 | do | 2,500 | 1.2 |
| 4 | do | 2 | do | 2,500 | 1.2 |
| 5 | do | 2 | Polyoxypropylene-polyoxyethylene, sequentially reacted. Weight ratio of propylene oxide to ethylene oxide is 6.7:1. | 2,645 | 1.2 |
| 6 | Pentaerythritol | 4 | Polyoxypropylene | 5,500 | 1.2 |
| 7 | Trimethylolpropane | 3 | Polyoxybutylene | 4,500 | 2.0 |
| 8 | Propylene glycol | 2 | Mixed polyoxybutylene-polyoxyethylene. Weight ratio of butylene to oxyethylenejis 1:1. | 2,500 | 1.0 |
| 9 | Trimethylolpropane | 3 | Mixture (1) polyoxypropylene-polyoxyethylene (weight ratio of oxypropylene to oxyethylene is 9:1). Mixture (2) polyoxyethylene-polyoxypropylene (weight ratio of oxyethylene to oxypropylene is 9:1). Two mixtures sequentially reacted. Weight ratio of mixture (1) to mixture (2) is 2.5:1. | 4,480 | 1.2 |
| 10 | do | 3 | Mixed polyoxybutylene-polyoxyethylene. Weight ratio of oxybutylene to oxyethylene is 3:1. | 60,000 | 3.0 |
| 11 | Glycerol | 3 | Mixed polyoxypropylene-polyoxyethylene. Weight ratio of oxypropylene to oxyethylene is 4:1. | 4,000 | 1.1 |
| 12 | 1,5-pentanediol | 2 | do | 4,500 | 1.3 |
| 13 | n-Hexanol | 1 | Polyoxypropylene-mixed polyoxyethylene- polyoxypropylene (weight ratio of oxyethylene to oxypropylene is 5.7:1). Sequentially reacted. Weight ratio of polyoxypropylene to mixed polyoxyethylene-polyoxypropylene is 1.5:1. | 3,000 | 1.2 |
| 14 | Propylene glycol | 2 | Mixed polyoxypropylene-polyoxybutylene. Weight ratio of oxypropylene to oxybutylene is 1:1. | 1,500 | 1.3 |
| 15 | Glycerol | 3 | Polyoxyethylene-polyoxypropylene sequentially reacted. Weight ratio of oxyethylene to oxypropylene is 0.9:1. | 7,500 | 1.5 |
| 16 | Butanol | 1 | Polyoxypropylene | [1] 1,115 | 1.2 |

[1] Molecular weight based on hydroxyl number determination.

As previously mentioned, one of the outstanding and, it is believed, unique advantages for the anionic polyether hydroxysulfonate surface active agent of the invention resides in its power to prevent the redeposition of soil when washing fabrics without the need for sodium carboxymethylcellulose as an auxiliary agent for this purpose. Washing compositions for clothes employing alkylarylsulfonate anionic surface active agents usually are formulated with such inorganic detergency builder salts as sodium tripolyphosphate and sodium metasilicate and such formulations often, if not usually, contain sodium carboxymethylcellulose to prevent soil redeposition. In strictly comparable formulations of this type, replacement of the alkylarylsulfonate with a polyether hydroxysulfonate according to this invention produces a detergent formulation that has far greater power to prevent soil redeposition than does the formulation containing an alkylarylsulfonate and sodium carboxymethylcellulose.

This is illustrated by the following data employing the polyether hydroxysulfonate compositions of the invention which are described in Examples 1, 2 and 3 in Table I. The formulations in which these tests were carried out are shown in the following Table II:

*Table II*

| Ingredient | Formulation A, Weight percent | Formulation B, Weight percent |
|---|---|---|
| Active agent | 40 | 40 |
| Sodium tripolyphosphate | 50 | 49 |
| Sodium metasilicate | 10 | 10 |
| Sodium carboxymethylcellulose | None | 1 | the formulation for comparison purposes is that which is fully described in U.S. 2,677,700, column 15, line 64, to column 16, line 6. The unique superiority of the composition of the invention in this regard is shown by the data in the following Table III:

*Table III*

FORMULATION A.—NO SODIUM CARBOXYMETHYLCELLULOSE

| Active Agent | Carbon Soil Removal Value, at 140° C. | Whiteness Retention Value |
|---|---|---|
| Example No. 1 | 191 | 157 |
| Example No. 2 | 283 | 174 |
| Example No. 3 | 239 | 182 |
| Standard alkylarylsulfonate | 225 | 40 |

FORMULATION B.—WITH SODIUM CARBOXYMETHYLCELLULOSE

| Example No. 1 | 300 | 164 |
| Example No. 2 | 381 | 181 |
| Example No. 3 | 289 | 175 |
| Standard alkylarylsulfonate | 295 | 78 |

Thus, the formulations containing Examples 1, 2 and 3 according to the invention produced whiteness retention values in the range from 157–182 without sodium carboxymethylcellulose in the formulation. The formulation containing the standard alkylarylsulfonate produced a whiteness retention value of only 78 when sodium carboxymethylcellulose was included in the formulation and of only 40 when there was no sodium carboxymethylcellulose in the formulation.

An important and advantageous property of the anionic polyether hydroxysulfonate composition of the invention is its ability to demulsify crude oil-water emulsions. Not only is the polyether hydroxysulfonate an effective active agent for demulsification formulations, but it enters into water-based formulations containing nonionic ethylene oxide condensate surface active agents and alcohol freezing point depressants and forms clear, homogeneous solutions that remain in one phase over the broad range of temperatures at which demulsification formulations must be employed. This property of forming homogeneous, one-phase aqueous demulsifying formulations of this type is not shared by other anionic sulfonates that have been employed heretofore, such as petroleum sulfonates and alkylarylsulfonates. A typical demulsification formulation containing a polyether hydroxysulfonate composition of the invention is given below in Table IV.

Table IV

| Ingredient: | Weight percent |
| --- | --- |
| Example No. 2 polyether sulfonate | 13.4 |
| Polyoxypropylene (mol. wt. 3000)–polyoxyethylene (mol. wt. 2450) nonionic | 13.4 |
| Ethylene glycol | 14.8 |
| Methanol | 14.8 |
| Water | 43.6 |

This formulation produces a clear, homogeneous aqueous solution that remains in a single phase and it was successfully employed to treat and demulsify a water-in-oil emulsion. The crude emulsion contained a paraffinic crude oil of 40–44° API gravity and contained about 30 weight percent of water. After treatment of the emulsion for 30 minutes at 110° F. with a concentration of the demulsifier formulation given in Table IV corresponding to 4 pints of the formulation per 100 barrels of emulsion, there was 0.8 weight percent of bottom sediment and water remaining in the oil layer. The water layer was clean and the oil layer was bright.

Another important and advantageous property of the anionic polyether hydroxysulfonate composition of the invention resides in its capability of emulsifying mixtures of water and polyether polyols that are alkylene oxide condensates. Stable emulsions of this type are relatively unknown and would be useful for cutting oil compositions where the cooling effect and lubricity of the polyether polyol can be employed to advantage. The polyether polyols are only very slightly, if at all, soluble in water so a stable emulsion is necessary in order to take advantage of their desirable properties in this field of use. Aqueous emulsions are specially desired because of their low cost and relative lack of flammability.

For example, we have successfully produced stable aqueous emulsions containing a trimethylolpropane-propylene oxide condensate having a molecular weight of 6500 and employing various polyether hydroxysulfonate compositions of the invention as the emulsifying agent. These emulsions were prepared by placing a measured amount of the polyether hydroxysulfonate into a 250 ml. beaker and then adding a measured amount of the polyether polyol to be emulsified. This mixture was stirred for two minutes with an electrically-powered, three bladed stirrer. Then, a measured amount of water was added while continuing to stir the mixture. The water was added dropwise and rapidly from a burette and the resulting mixture was then stirred for an additional one minute. The emulsion was then poured into a bottle in order to observe its stability. The tests that were carried out are further described in Table V, below. The polyether hydroxysulfonate emulsifiers that were used are identified by reference to the example numbers previously employed in Table I and the weight of the polyether hydroxysulfonate is given in a 100% active agent basis.

Table V

| Polyether Sulfonate Emulsifier, grams | Amount of Polyether Polyol | Amount of Water | Stability of Emulsion |
| --- | --- | --- | --- |
| Example No. 6, 5 grams | 25 ml | 75 ml | Stable after 3 days. |
| Example No. 5, 5 grams | 25 ml | 75 ml | Stable after 14 days. |
| Example No. 4, 5 grams | 25 ml | 75 ml | Do. |
| Example No. 7, 2.5 grams | 25 ml | 75 ml | Stable after standing overnight. |
| Example No. 9, 2.5 grams | 25 grams | 75 ml | Stable after 4 days. |
| Example No. 10, 2.5 grams | 25 grams | 75 ml | Do. |
| Example No. 11, 2.5 grams | 25 grams | 75 ml | Do. |
| Example No. 12, 2.5 grams | 25 grams | 75 ml | Do. |
| Example No. 13, 2.5 grams | 25 grams | 75 ml | Do. |

It should be apparent that the polyether hydroxysulfonate composition of this invention possesses surprisingly unique surface active properties. In the field of general detergency, the polyether hydroxysulfonate is admirably suited for formulation into liquid detergent compositions. An excellent heavy-duty liquid detergent formulation containing the polyether hydroxysulfonate composition illustrated by Example No. 1, herein, consists of the following.

| Ingredient: | Weight percent |
| --- | --- |
| Example No. 1 polyether hydroxysulfonate | 17.3 |
| Tetrapotassium pyrophosphate | 17.3 |
| Sodium toluenesulfonate | 5.4 |
| Water | 60.0 |

We claim:

1. An anionic surface active cogeneric mixture of polyether hydroxysulfonate compounds having the formula:

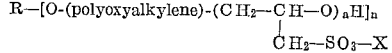

wherein
(1) R is a saturated hydrocarbyl radical which together with attached oxygen is the residue of an alcohol having from one to six carbon atoms and from one to six hydroxyl groups;
(2) $n$ is an integer from one to six;
(3) $a$ is from one to four;
(4) polyoxyalkylene represents a chain of oxalkylene radicals, the total molecular weight of the polyoxyalkylene portion of the compounds being from about 1,000 to 75,000, said molecular weight including the molecular weight of $R-[O-]_n$, wherein R and $n$ are defined as above, said oxyalkylene radicals being selected from the group consisting of oxyalkylene radicals having from two to four carbon atoms and mixtures thereof, and said chain containing not more than about 50 weight percent of oxyethylene radicals, and
(5) X is a cation being selected from the group consisting of sodium, potassium, ammonium, calcium, magnesium, and alkylol-substituted ammonium in which alkylol contains from two to three carbon atoms.

2. An anionic surface active mixture of polyether hydroxysulfonate compounds according to claim 1 wherein polyoxyalkylene represents a chain of oxypropylene radicals.

3. An anionic surface active mixture of polyether hydroxysulfonate compounds according to claim 1 wherein polyoxyalkylene represents a chain consisting of a mixture of oxypropylene and oxyethylene radicals.

4. An anionic surface active mixture of polyether hydroxysulfonate compounds according to claim 1 wherein polyoxyalkylene represents a chain consisting of a mixture of oxybutylene and oxyethylene radicals.

5. An anionic surface active mixture of polyether hydroxysulfonate compounds according to claim 1 wherein polyoxyalkylene represents a chain consisting of a mixture of oxypropylene and oxybutylene radicals.

6. An anionic surface active mixture of polyether hydroxysulfonate compounds according to claim 1 wherein polyoxyalkylene represents a chain of oxybutylene radicals.

7. An anionic surface active mixture of polyether hydroxysulfonate compounds according to claim 1 wherein R, together with attached oxygen represents propylene glycol with its hydroxyl hydrogen atoms removed, wherein $n$ equals 2, wherein polyoxyalkylene consists of a chain of oxypropylene groups, wherein the molecular weight of said oxypropylene chain, including the molecular weight of propylene glycol and multiplied by 2, is in the range from 1000 to 3000, and wherein X is sodium.

References Cited by the Examiner
UNITED STATES PATENTS

| | | | |
|---|---|---|---|
| 2,535,678 | 12/1950 | Hollander et al. | 260—513 |
| 2,965,658 | 12/1960 | Kirkpatrick | 260—513 |
| 2,989,547 | 6/1961 | Whyte | 260—513 |
| 3,024,273 | 3/1962 | Whyte et al. | 260—513 |
| 3,102,893 | 9/1963 | Gaertner | 260—513 |

LORRAINE A. WEINBERGER, *Primary Examiner.*

LEON ZITVER, *Examiner.*